United States Patent [11] 3,627,995

[72] Inventors Charles D. Warner, Jr.;
Richard A. Taylor, both of Los Gatos, Calif.
[21] Appl. No. 3,643
[22] Filed Jan. 19, 1970
[45] Patented Dec. 14, 1971
[73] Assignee Computer Synectics, Inc.
Santa Clara, Calif.

[54] COMPUTER SYSTEM EVENT COUNTER
5 Claims, 4 Drawing Figs.

[52] U.S. Cl. .......... 235/92 PL, 235/92 R, 340/172.5, 235/155, 235/92 EA, 235/92 BD, 328/45
[51] Int. Cl. .......... H03k 21/16
[50] Field of Search .......... 235/92 PL; 340/172.5

[56] References Cited
UNITED STATES PATENTS
3,460,097 8/1969 Kubo .......... 235/92 PL OTHER REFERENCES
Grabbe, Ramo and Wooldridge Handbook of Automation Computation and Control, Vol. 2, 1959 John Wiley & Sons, p. 16–28

*Primary Examiner*—Maynard R. Wilbur
*Assistant Examiner*—Robert F. Gnuse
*Attorneys*—Jack M. Wiseman and Thomas E. Schatzel

ABSTRACT: An electronic systems event counter network for counting the number of times a computing system event occurs by monitoring a system signal line. The network is adapted to be attached to a line of a logic family in the computing system and senses signals on the line while providing isolation from the system. Toward this end, the events counter network comprises a sensor for detecting the presence of electronic signals. A plurality of counter stages joined in tandem count the number of occurrences in the electronic signals and present the same in decimal form for display on a control panel. The sensor is attached to a line of a logic family within the host computing system with the selected line being determined according to the event to be sensed. The sensor provides isolation from the host system, thereby avoiding imposition of line loading or degrading system performance.

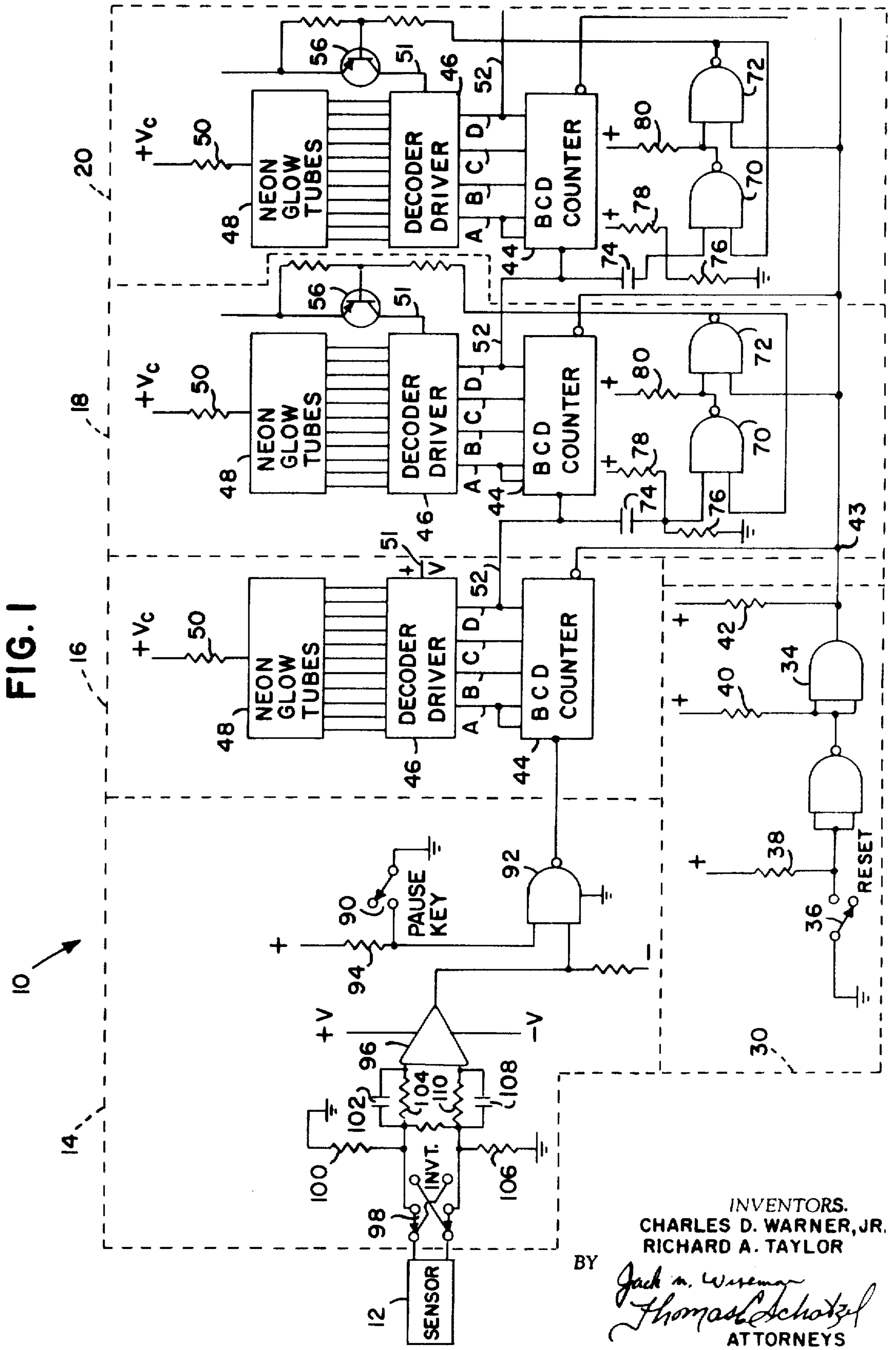
FIG. I
INVENTORS.
CHARLES D. WARNER, JR.
RICHARD A. TAYLOR
BY
Jack M. Wiseman
Thomas L. Schatzel
ATTORNEYS INVENTORS.
CHARLES D. WARNER, JR.
RICHARD A. TAYLOR
BY Jack M. Wiseman
Thomas Schatzel
ATTORNEYS INVENTORS.
CHARLES D. WARNER, JR.
RICHARD A. TAYLOR
BY Jack M. Weisman
Thomas Schatzel
ATTORNEYS

COMPUTER SYSTEM EVENT COUNTER

BACKGROUND OF THE INVENTION

The present invention relates to signal event counter networks. Such networks are highly desirable for use in computing systems for monitoring, sensing and counting events taking place within the computing system. Counts may include such events as lines printed on a line printer; cards punched on a card punch; cards read on a card reader; I/O interrupts; seeks executed on a desk file; read/writes performed; operator interventions; I/O errors; CPU errors; storage errors; or entries into supervisor, manual, problem, or wait states. A pending application on a System Utilization Monitor For Computer Equipment was filed by Charles D. Warner, Jr. on Oct. 24, 1969, Ser. No. 869,308. The assignee of the present application is also the assignee of the aforesaid application.

SUMMARY OF THE PRESENT INVENTION

The present invention pertains to a versatile counter adapted to display an accumulative count and to provide highly reliable performance with low-power consumption. It is further adapted to be small in size and easily attachable to a signal point in a computing system.

An exemplary embodiment is adapted to monitor a system signal line and count the number of occurrences by sensing the presence of electronic signals. The accumulated count is presented in decimal form for display on a control panel. A sensor may be attached to a line of a logic family within the host-computing system with the selected line being determined according to the event to be sensed. The sensor provides isolation from the host system, thereby avoiding imposition of line loading or degrading system performance.

BRIEF DESCRIPTION OF THE DRAWINGS

FIGS. 1 and 1A are a circuit diagram for the counter accumulator of the present invention with FIG. 1A placed to the right of FIG. 1;

DESCRIPTION OF PREFERRED EMBODIMENT

Figure 1A:
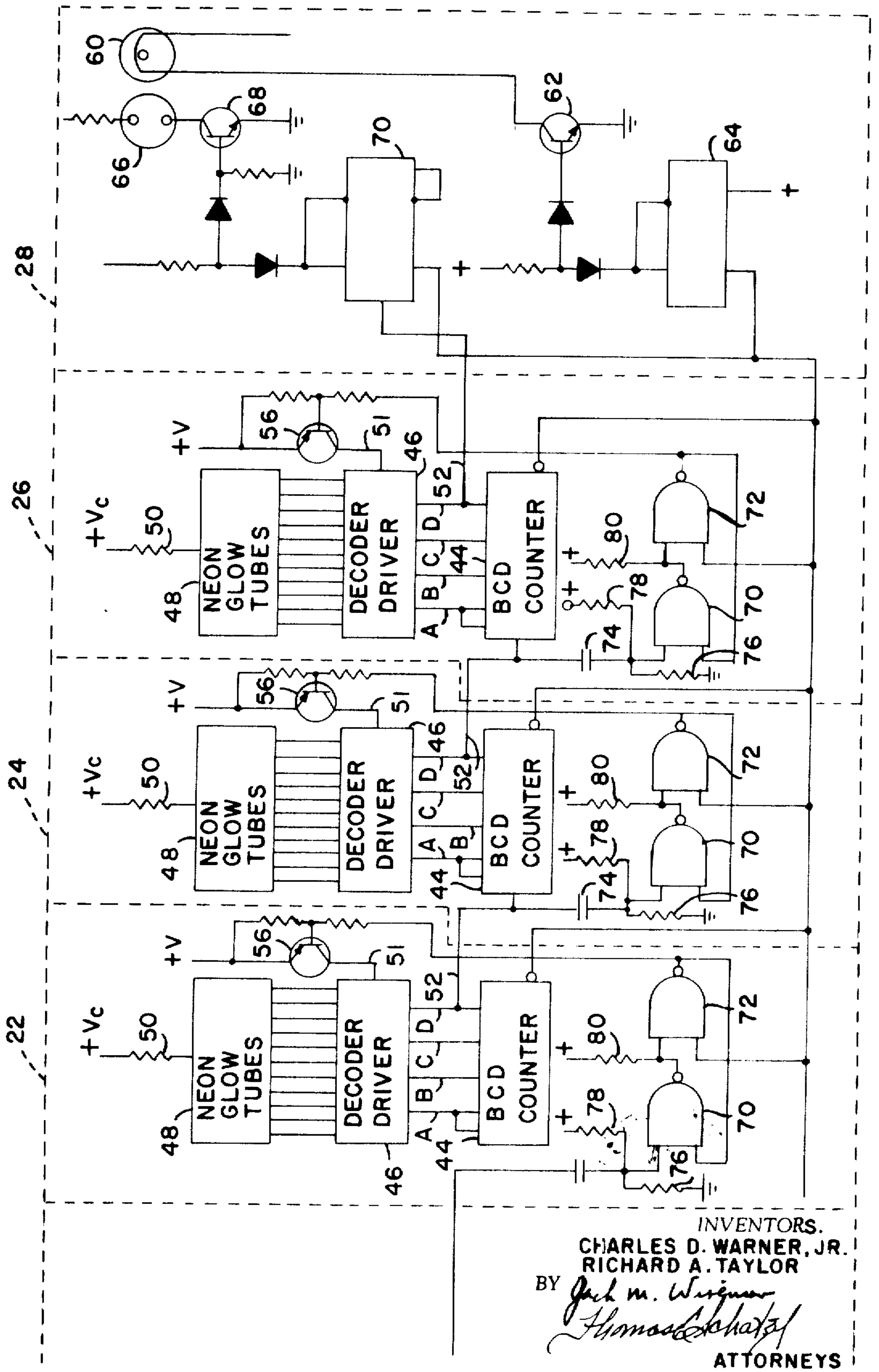
Figures 2, 3:
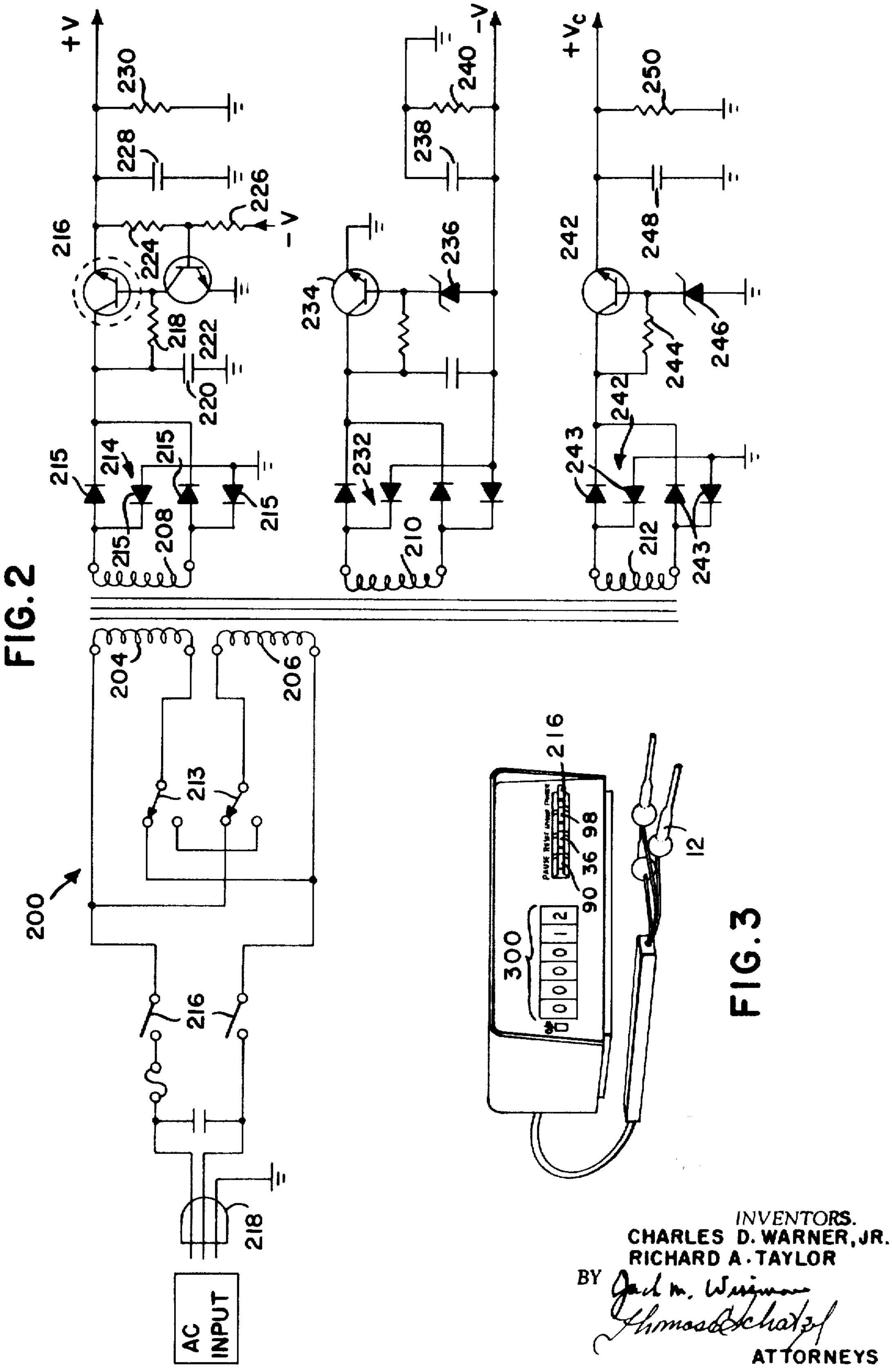
FIG. 2 is a circuit diagram of a power supply adapted for use with the circuit of FIGS. 1 and 1A.
FIG. 3 is a perspective view of a packaged network of the present invention illustrated with a counter display.

The drawings depict an event counter of the present invention in which, FIGS. 1 and 1A illustrate a circuit diagram for a counter network of the present invention and referred to by the general reference character 10. FIG. 2 illustrates a power supply, referred to by the general reference character 11, and FIG. 3 illustrates a packaged assembly of the networks of FIGS. 1, 1A and 2 with a display counter. The network 10 includes a sensor 12 which is adapted to be secured to a line within a computing system for monitoring the line and sensing the presence of a signal on the line. The sensor 12 is joined by cable to an input network 14 adapted to receive the sensed signal and provide an output signal of a magnitude and shape for digital circuitry. A suitable sensor is disclosed in the aforesaid pending application.

The network 10 further includes a plurality of individual stages connected in tandem and including a units counter stage 16, a tens counter stage 18, a hundreds counter stage 20, a thousands counter stage 22, a ten thousands counter stage 24 and a hundred thousands counter stage 26, for counting and providing an accumulative count of the pulses provided at the output of the input stage 14. The units counter stage 16 responds to all signals from the stage 14 and provides a continuous indication of the units, i.e. 0–9. The tens counter stage 18 counts and provides indication for the number of signals in the tens, i.e. 10–99. The hundreds counter stage 20 counts and provides an indication for signals for the number of signals in the hundreds, i.e., 100–999. The thousands counter stage 22 counts and provides an indication for signals in the thousands, i.e., 1000–9999. The ten thousands counter stage 24 counts and provides an indication for the digits in the tens of thousands, i.e., 10000–99999. The hundreds thousands counter stage 26 counts and provides signals in the hundreds of thousands, i.e., 100,000–999,999. Accordingly, the stages 18, 29, 22, 24 and 26 respond to every tenth pulse of the preceding stage, whereby there is provided an indication and accumulated count for the number of pulses from 0 to 999,999 sensed by the sensor 12.

The network 10 also includes an overflow stage 28 designed to indicate when the counter stages have exceeded their capacity, which occurs upon sensing the one millionth accumulative count. Since the counter displays a count up to and including 999,999, the 1,000,000 count creates an overflow and the stage 28 responds to indicate the overflow.

The network 10 is designed so that when the pause key (hereinafter described) is opened and the counter is made inoperable, the accumulated count will be retained and displayed when the cause is closed. Accordingly, to reset the network, a reset stage 30 is provided. The reset stage 30 includes a pair of AND-gates 32 and 34 connected in cascade with the input terminals to each of the gates connected in common. The input of the AND-gate 32 is connected through a two-way switch 36 to a ground potential and through a resistor 38 is connected to the positive side of a direct current potential source. The output of the AND-gate 32 is connected to the AND-gate 34 which is also connected through a resistor 40 to the positive side of the direct current potential source. The output of the AND-gate 34 is connected to the positive side of the direct current potential source through a resistor 42 and to a terminal 43 leading to each of the counters 16, 18, 20, 22, 24 and 26. With the switch 36 in the open position, a positive signal is applied at each of the input terminals of each of the AND-gates 32 and 34 and to the input of each of the counter stages. However, when it is desired to reset the counter network 10, the switch 36 is closed and the positive potential is removed from the input terminals of the AND-gate 32. This action causes all the counter stages to be reset to the 0 count position.

Each of the counter stages 16, 18, 20, 22, 24 and 26 includes a binary code decimal (BCD) counter 44. The counters 44 are adapted to receive digital input signals and provide binary coded output signals across four output lines A, B, C and D. The lines A may be viewed as having a weight 1, the lines B a weight 2, the lines C a weight 4 and the lines D a weight 8. Accordingly, the lines A, B, C and D may carry binary code decimal signals ranging in values of 0 to 9. The four lines A, B, C and D in each stage are connected to a decoder driver 46. Each counter stage has a decoder driver 46. The decoder driver 46 receives the binary coded decimal signals and provide appropriate decimal numeral signals across one of ten output lines depending on the decimal numeral 0–9 decoded to drive a visual indicator. The lines from each of the decoder drivers 46 are received by the visual indicators in the form of a bank 48 of neon glow tubes carrying numerals 0–9. Each counter has a bank 48 of neon glow tubes. The tubes with the appropriate numeral are driven and illuminated in accordance with the line carrying a drive signal. The banks 48 are biased by the positive side of a direct current potential source through a resistor 50. The drivers 46 are each biased by a potential applied to a line 51, which is connected to the direct current source $V_2$.

The input pulses to the counter 44 of the unit counter stage 16 are received from the input stage 14. Accordingly, the stage 16 counts every pulse received within the network. The counter 44 of the unit counter stage 15 provides an output pulse across a line 52 joined to the D line on every tenth received pulse. Accordingly, as the accumulated count goes from "9" to a "0," the signal on the line D goes from a digital "1" to a "0." The input of the tens counter stage 18 is joined to the line 52 and senses and counts this tenth pulse indication. The counter 44 of the stage 18 provides a BCD signal indicative of the number of tens of pulses sensed by the sensor 12. The bias line 51 of the drivers 46 of the stages 18, 20, 22, 24 and 26 are connected to a gate circuit, which includes a PNP-transistor 56. There is a transistor 56 for each of the stages 18, 20, 22, 24 and 26. The collector electrode of the transistor 56 is connected to the line 51, the emitter electrode of the transistor 56 is connected to a direct current source V, and the base electrode of the transistor 56 is connected to the emitter electrode of the same transistor. The base electrode of the transistor 56 is also connected to a "hold" circuit in a manner to be described hereinafter.

The line 52 of the counter 44 of tens-counter stage 19 is connected to the input of the counter 44 of the hundreds counter stage 20. Accordingly, the stage 20 receives an input pulse for each one hundred pulses sensed by the sensor 12. As the accumulated count goes from "99" to "00," the binary digit on line D goes from a "1" to a "0" which serves as an input signal to the hundreds counter stage 20.

The line 52 of the counter 44 of the hundreds counter stage 20 is connected to the input of the counter 44 of the thousands counter stage 22. Accordingly, the stage 22 receives an input pulse for each thousand pulses sensed by the sensor 12. As the accumulated count of the stage 16, 18 and 20 goes from "999"to "000," a signal is produced to the thousands counter stage 22. Similarly, the line 52 of the stage 22 is connected to the ten thousands stage 24 so that as the accumulated count goes from "999" to "000" a signal is received at the input of the stage 24. The line 52 of the stage 24 is connected to the hundred thousands stage 26 so that as the accumulated count goes from "9999" to "0000" a signal is received at the input of the stage 26.

The line 52 of the stage 26 is connected to the overflow stage 28 so that once the accumulated count reaches "999,999" and another input pulse is sensed, the line D tends to go from a binary "1" to a binary "0." Thus, a pulse is produced to the input of the stage 28 and an overflow indicator, in the form of a lamp 60 is energized. The lamp 60 is connected to the collector-emitter path of a transistor 62 between a positive potential and ground reference potential. The base of the input transistor 62 is connected to a logic gate 64. The input of the gate 64 is connected to the line 52 of the stage 26 and to the gate 34 of the reset network. With a signal on the line 52 after the accumulated count is 999,999 and with the switch 36 open, the transistor 62 conducts thereby energizing the lamp 60.

The stage 28 also includes an overflow bit storage unit 66 which is connected between the positive side of the direct current potential source $V_c$ to ground reference potential through the collector-emitter path of a transistor 68. The base of the transistor 68 is connected to a logic gate 70. The input of the gate 70 is connected to the line 52 of the stage 26 and to the terminal 43 of the reset network. The bit storage unit 66 provides a binary "1" when operated. Accordingly, upon receipt of the signal indicating one million sensed pulses, the lamp 60 is energized and the storage unit 66 displays a binary "1." The count is then held until the reset switch 36 is closed resetting all the stages 16, 18, 20, 22, 24 and 26 to decimal zero. During the counting of the second million pulses, the overflow indicator lamp 60 remains energized and remains so until a second pulse is received at the overflow stage 28. Upon receipt of the pulse "2,000,000" the bit storage unit 66 is suppressed, although the lamp 60 remains energized. A third overflow would cause the binary "1" of the storage unit 66 to reappear, a fourth overflow would cause suppression, et cetera.

It may further be noted that the lines 52 of each of the counters 44 of the stages 16, 18, 20, 22 and 24 are connected, respectively, to an input of the next stage as well as to the input of a "hold" circuit comprising a pair of AND-gates 70 and 72. There is a hold circuit for each of the counter stages. Each line 52 is connected through a capacitor 74 to a common junction having a resistor 76 connected to ground and a resistor 78 connected to the positive side of a direct current potential source. The junction is also common to the input of the AND-gate 70. The AND-gate 70 output is connected in common to the positive side of a direct current potential source through a resistor 80 and to the input of the AND-gate 72. The gate 72 input is also connected to the terminal 43. The output of the AND-gate 72 is connected to the input of the AND-gate 70 and to the base of the associated transistor 56. Accordingly, when the associated line 52 signal goes from a binary "1" to a binary "0," a signal is received by the gate 70. A responsive signal is thus received at the base of the transistor 56 associated therewith so that the associated transistor 56 conducts and the associated driver 46 is operated. While the preceding stage is accumulating its count, the gates 70 and 72 are nonconductive, the associated transistor 56 does not conduct, and the count is held. Upon the preceding counter stage going from "9" to "0," the stage is activated. For example, while stage 16 goes from "0" to "9,"stages 18, 20, 22, 24 and 26 hold; while the stage 18 goes from "0" to "9," stages 20, 22, 24 and 26 hold, et cetera. The network 10 suppresses leading zeros (those to the left of the most significant digits of the accumulated count) until the network comprised of AND-gates 70 and 72 receives the signal from the preceding counter. Once this occurs in all counters 44, all leading zeros are displayed whether or not the storage unit 66 displays a binary "1."

The input stage 14 includes a two-pole switch 90 (which was previously referred to as a pause key) connected from ground to the input of an AND-gate 92 and to a positive side of a potential source through a resistor 94. The input of the gate 92 is connected to the output of an amplifier 96. The output of the gate 92 is connected to the input of the counter 44 of the stage 16. The switch 90 provides for a means for delaying the count of the network 10 while retaining the power so that if during the operation of the network 10 it is desired by the operator to delay counting, the switch 90 is closed. Counting then resumes when the switch 90 is opened.

The input stage 14 is further designed to respond to the leading or trailing edges of sensed signals. Response to either the leading or trailing edge may be selected by means of an inversion switch 98 at the input of the amplifier 96 of the input stage 14. The switch 98 is connected to the input of the amplifier 96 through a pair of complementary paths. One path includes a resistor 100, a capacitor 102 and a resistor 104. The other includes a resistor 106, a capacitor 108 and a resistor 110. This inversion method allows counting to occur from either the leading or trailing edge of the sensed input signals depending upon the position of the switch. If either a delay or an invert condition is selected prior to removing of the power, the selected state still remains when power is turned on again. To reset the counter 10, the reset switch 36 is closed. Closing of the reset switch 36 also turns off the overflow indicator lamp 60 in the event that it is on. It may be further noted that resetting through the reset switch 36 is dependent upon the application of power to the system and consequently resetting does not occur automatically when power is turned off.

FIG. 2 illustrates a power supply, referred to by the general reference 200, which may be utilized in combination with the network 10. The power supply includes a transformer 202 with a pair of primary windings 204 and 206 and a set of three secondary windings 208, 210 and 212. The primary windings are connected to a switch 213 for connecting the primary windings either in series or parallel depending upon the potential value of the AC input. The primary windings extend through an on-off switch 216 to a power plug 218. One line of the secondary windings 208 is connected to a rectifier 214 which includes a plurality of diodes 215 connected across the winding and to the collector of a heat sink transistor 216. The base of the transistor 216 is connected to the collector electrode through a resistor 218 and is connected to ground through a capacitance 220. The base is also connected to the collector electrode of a transistor 222. The emitter electrode of the transistor 222 is grounded. The base of the transistor 222 is connected to a voltage divider network comprising a pair of resistors 224 and 226. The resistor 226 is connected to the negative side of direct current potential V source. The resistor 224 is connected to the emitter electrode of the transistor 216. The emitter electrode is connected to a filter comprising the resistor 224, a capacitor 228 and a resistor 230. The resistor 230 and the capacitor 228 are connected in parallel to ground. Accordingly, there is provided a +V potential output.

To provide the −V potential output, the secondary winding 210 is connected to a rectifier 232 which is connected to the base and collector electrode of an NPN-transistor 234. The base of the transistor 234 is connected to a Zener diode 236. The emitter of the transistor 234 is at ground potential and the anode of the Zener diode 236 is connected to a filter comprising a capacitor 238 and resistor 240. The capacitor 238 and the resistor 240 are connected in parallel. The negative potential is applied from the output of the filter.

To provide the potential source $+V_c$ potential, the secondary winding 212 is connected to a rectifier 242 comprising diodes 243. The diodes 243 are connected to the collector of an NPN-transistor 242. The base of the transistor 242 is connected through a resistor 244 to the collector and is connected to ground through a Zener diode 246. The emitter is connected to a filter comprising a capacitor 248 and resistor 250 connected in parallel.

The front panel of the packaged assembly of FIG. 3 serves as the display and control panel, and includes a set of 6 windows 300 with each window, from right to left displaying the neon glow tubes 48 of the stages 16, 18, 20, 22, 24 and 26, respectively. The neon glow tube 60 is visible from the exterior. Actuating arms for the switches 36, 90, 98 and 216 are provided. As may be noted, the system provides for a compact, low power and versatile system of light, small physical overall size. It further allows for attaching a number of individual event counters of the present invention to be simultaneously attached to a computing system.

We claim:

1. An event counter network comprising, in combination:
   a plurality of counterstages joined in tandem, a first of said stages responding to each input signal and each succeeding stage responding to every tenth signal received by the preceding stage, each of the counterstages including a binary code decimal counter responding to binary input signals and providing a binary code decimal signal output and decoder means for decoding the binary code decimal signal and generating responsive decimal digit signals,
   each binary code decimal counter having four output points having binary weights 1, 2, 4, and 8, respectively,
   each of the decoder means receiving the signals of its associated output points and providing responsive decimal digit signals of 0–9,
   the input of each of the binary code decimal counters succeeding the first binary code decimal counter being connected to the output point having a binary weight 8 of the binary code decimal counter of the preceding stage,
   each of said succeeding binary code decimal counters being responsive to a binary input from a binary "1" to a binary "0,"
   hold means for holding the responsive decimal digit signals of the succeeding stages intermediate receipt of responsive input signals,
   indicator tube banks responsive to the decimal digit signals and indicating a decimal digit responsive to said decimal digit signals, each of said indicator tube banks providing a decimal digit 0–9 responsive to said decimal digit signals;
   an overflow network responsive to the last of said counter stages for generating an overflow indication after said last stage records a decimal "9,"
   reset means for resetting all of said counter stages to decimal digit "0;" and
   delay means for temporarily interrupting the count of said network while simultaneously receiving input signals.

2. The network of claim 1 further including input circuit means for receiving said sensed signals and generating responsive binary "0" and "1" signals, the output of the input circuit is connected to said first counter stage.

3. The network of claim in which
   the input circuit responds to the edge of the sensed signal.

4. The network of claim 3 in which
   the input circuit responds to either the leading or trailing edge of the sensed pulse.

5. The network of claim 4 further including
   inversion switching means for selectively switching the input circuit means to respond to the leading or trailing edge of the sensed signals.

* * * * *